(12) United States Patent
Wei

(10) Patent No.: US 9,778,547 B1
(45) Date of Patent: Oct. 3, 2017

(54) MOBILE PHONE STABILIZER

(71) Applicant: Guilin Feiyu Technology Corporation Ltd., Guilin, Guangxi (CN)

(72) Inventor: Chengyun Wei, Guangxi (CN)

(73) Assignee: Guilin Feiyu Technology Corporation Ltd., Guilin (CN)

( * ) Notice: Subject to any disclaimer, the term of this patent is extended or adjusted under 35 U.S.C. 154(b) by 0 days.

(21) Appl. No.: 15/246,477

(22) Filed: Aug. 24, 2016

(30) Foreign Application Priority Data

Jul. 13, 2016 (CN) ...................... 2016 2 0736726 U

(51) Int. Cl.
*G03B 17/00* (2006.01)
*G03B 17/56* (2006.01)

(52) U.S. Cl.
CPC ......... *G03B 17/561* (2013.01); *G03B 17/563* (2013.01)

(58) Field of Classification Search
CPC ................................ G03B 17/00; G03B 17/56
USPC .......................................................... 396/421
See application file for complete search history.

(56) References Cited

U.S. PATENT DOCUMENTS

| 2005/0185089 A1* | 8/2005 | Chapman | F16M 11/10 348/375 |
| 2013/0233986 A1* | 9/2013 | Rasheta | G03B 17/561 248/205.1 |
| 2015/0071627 A1* | 3/2015 | Hoang | F16M 13/00 396/421 |
| 2015/0308618 A1* | 10/2015 | Valero | F16M 13/04 700/213 |
| 2016/0261782 A1* | 9/2016 | Li | H04N 5/232 |

FOREIGN PATENT DOCUMENTS

CN WO 2016050011 A1 * 4/2016 ............. H04N 5/232

* cited by examiner

*Primary Examiner* — Clayton E Laballe
*Assistant Examiner* — Fang-Chi Chang

(57) ABSTRACT

The present invention provides a mobile phone stabilizer, comprising a fixing device for mobile phone, an angle adjusting device and a two-hand control device, wherein the angle adjusting device comprises an X-axis adjusting mechanism, a Y-axis adjusting mechanism and a Z-axis adjusting mechanism which are orthogonally arranged in three-dimensional space; wherein the Z-axis adjusting mechanism has a connecting end fixedly connected with the two-hand control device and has an output end rotatablely connected with a connecting end of the Y-axis adjusting mechanism, the Y-axis adjusting mechanism has an output end rotatablely connected with a connecting end of the X-axis adjusting mechanism, the X-axis adjusting mechanism has an output end rotatablely connected with the fixing device for mobile phone. The mobile phone stabilizer of the present invention has a simple structure and can effectively improve the shooting stability of the mobile phone.

7 Claims, 3 Drawing Sheets

MOBILE PHONE STABILIZER

CROSS REFERENCE TO RELATED APPLICATIONS

This application claims priority from Chinese Utility Model Application No. 201620736726.6 filed on Jul. 13, 2016, the entire contents of which are incorporated herein by reference.

FIELD OF THE INVENTION

The present invention relates to the field of mobile phone accessory, more particularly to a mobile phone stabilizer.

BACKGROUND OF THE INVENTION

In order to get a sharper picture, the existing camcorders and cameras are usually provided with a matched stabilizer to avoid camera shaking during shooting which may lead to unclear images or shaking scenes.

With the advent of intelligent mobile phone, the mobile phones are not only used for communicating, but also used for taking photos and videos, advantageously with high definition. Some types of mobile phones even have ten millions pixels. In daily lives, the mobile phone gradually takes the place of professional photography equipment, such as camcorders and cameras, to shoot. However, mobile phone shooting has a stability problem which has not been solved yet. Video shooting usually requires high stability, or else the captured videos with shaking scenes may make the audience fidgety, tired and disgusted.

Therefore, it is desired to provide a mobile phone stabilizer with simple structure, which can effectively contribute to good mobile phone stability during shooting.

SUMMARY OF THE INVENTION

The present invention aims to provide a mobile phone stabilizer which has a simple structure and can effectively improve the shooting stability of the mobile phone.

In order to achieve the above goal, the present invention provides a mobile phone stabilizer, comprising a fixing device for mobile phone, an angle adjusting device and a two-hand control device, wherein the angle adjusting device is connected with the two-hand control device, the fixing device for mobile phone is connected with the angle adjusting device and is positioned in the middle of the two-hand control device; wherein the angle adjusting device comprises an X-axis adjusting mechanism, a Y-axis adjusting mechanism and a Z-axis adjusting mechanism which are orthogonally arranged in three-dimensional space; wherein the Z-axis adjusting mechanism has a connecting end fixedly connected with the two-hand control device and has an output end rotatablely connected with a connecting end of the Y-axis adjusting mechanism, the Y-axis adjusting mechanism has an output end rotatablely connected with a connecting end of the X-axis adjusting mechanism, the X-axis adjusting mechanism has an output end rotatablely connected with the fixing device for mobile phone.

Furthermore, the Z-axis adjusting mechanism comprises a first motor and a first connecting arm, wherein the first motor is fixedly connected with the first connecting arm, the first connecting arm is fixedly connected to the two-hand control device, the first motor has an output shaft connected with the Y-axis adjusting mechanism, and the Y-axis adjusting mechanism is rotatable about the first motor in horizontal direction.

Furthermore, the Y-axis adjusting mechanism comprises a second motor and a second connecting arm, wherein the second motor is connected with the second connecting arm, the second connecting arm is fixedly connected to the output shaft of the first motor, the second motor has an output shaft connected with the X-axis adjusting mechanism, and the X-axis adjusting mechanism is rotatable about the second motor in a perpendicular direction.

Furthermore, the X-axis adjusting mechanism comprises a third motor and a third connecting arm, wherein the third motor is connected with the third connecting arm, the third connecting arm is fixedly connected to the output shaft of the second motor, the third motor has an output shaft connected with the fixing device for mobile phone, and the fixing device for mobile phone is rotatable about the third motor in a perpendicular direction.

Furthermore, the third connecting arm is arranged with a retaining member, and a first sliding groove and a second sliding groove which are superimposed and intersected, wherein the first sliding groove is slidably connected with the second sliding groove, and the retaining member is connected between the first sliding groove and the second sliding groove.

In a modification to the above technical solution, the two-hand control device comprises a connection part and two handheld parts, wherein the connection part is fixedly connected between the two handheld parts, and the connection part is fixedly connected with the Z-axis adjusting mechanism.

Furthermore, the handheld part has a hollow interior in which a battery is arranged.

Furthermore, the handheld part is arranged with a USB interface for connecting with external computer and a plurality of control buttons for controlling the angle adjusting device.

Furthermore, the handheld part is provided with a thread at an end away from the connection part.

In a modification to the above technical solution, the fixing device for mobile phone comprises a clamp plate, and a first clamp and a second clamp which are used for fixing the mobile phone, wherein the first clamp and the second clamp are respectively arranged on two sides of the clamp plate and are movable relative to each other.

Compared with the existing technologies, the mobile phone stabilizer of the present invention has advantages as follows: due to the fixing device for mobile phone, the angle adjusting device and the two-hand control device, the mobile phone stabilizer of the present invention prevents the mobile phone from shaking during shooting and avoids shaking scenes or unclear images, and thus greatly improves the shooting stability of mobile phone. Meanwhile, by the adjustment and coordination of the X-axis adjusting mechanism, the Y-axis adjusting mechanism and the Z-axis adjusting mechanism, the mobile phone stabilizer enables the mobile phone to shoot at multi angles according to the requirement of the user.

BRIEF DESCRIPTION OF THE DRAWINGS

In order to better explain the technical solutions of embodiments of the present invention, figures of embodiments are briefly introduced as follows.

In the figures: 1.fixing device for mobile phone; 11.first clamp; 12.second clamp; 13.clamp plate; 14.mobile phone; 21.handheld part; 211.USB interface; 212.control button; 22.connection part; 31.Z-axis adjusting mechanism; 311.first connecting arm; 312.first motor; 32.Y-axis adjusting mechanism; 321.second connecting arm; 322.second motor; 33.X-axis adjusting mechanism; 331.third connecting arm; 332.third motor; 333.sliding assembly.

DETAILED DESCRIPTION OF ILLUSTRATED EMBODIMENTS

Embodiments of the present invention are further clearly and completely explained below in conjunction with figures. It is evident that the described embodiments are merely exemplary but not limited. Those skilled in the art may change or modify the embodiments to obtain equivalents without departing from the scope of the present invention.

Figure 1:
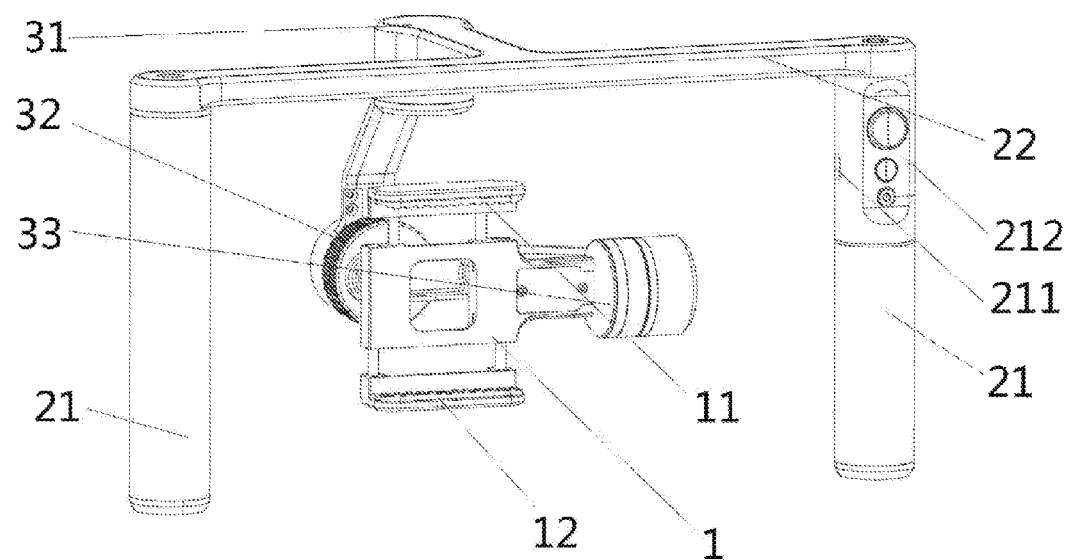
FIG. 1 is a schematic drawing of a mobile phone stabilizer according to an embodiment of the present invention.
Figure 2:
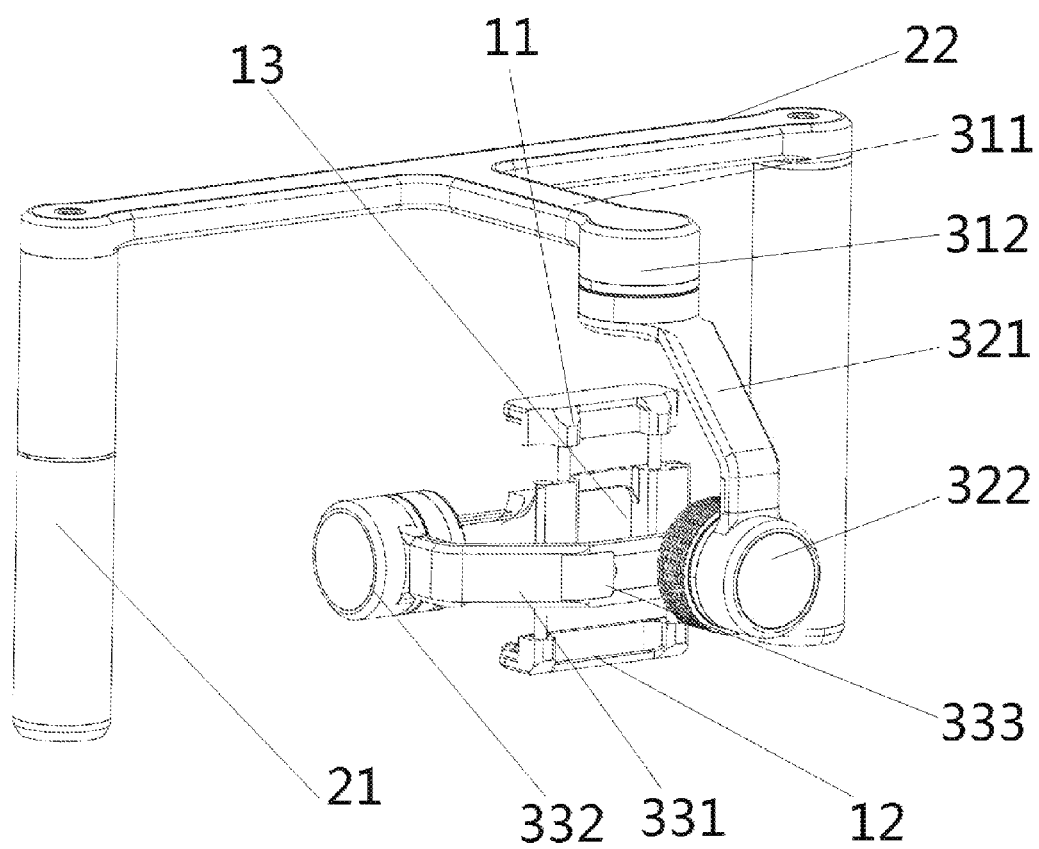
FIG. 2 is a schematic drawing of the mobile phone stabilizer according to the embodiment of the present invention viewed at another angle.

Referring to FIGS. 1-2, the present invention provide a mobile phone stabilizer, comprising a fixing device for mobile phone, an angle adjusting device and a two-hand control device, wherein the angle adjusting device is connected with the two-hand control device, the fixing device for mobile phone is connected with the angle adjusting device and is positioned in the middle of the two-hand control device, wherein the angle adjusting device comprises an X-axis adjusting mechanism 33, a Y-axis adjusting mechanism 32 and a Z-axis adjusting mechanism 31 which are orthogonally arranged in three-dimensional space; wherein the Z-axis adjusting mechanism 31 has a connecting end fixedly connected with the two-hand control device and has an output end rotatablely connected with a connecting end of the Y-axis adjusting mechanism 32, the Y-axis adjusting mechanism 32 has an output end rotatablely connected with a connecting end of the X-axis adjusting mechanism 33, the X-axis adjusting mechanism 33 has an output end rotatablely connected with the fixing device for mobile phone. Owing to the fixing device for mobile phone, the angle adjusting device and the two-hand control device, phone shake during shooting which results in shaking scenes or unclear images can be avoided, and thus the stability of mobile phone during shooting can be greatly improved. Meanwhile, by the adjustment and coordination of the X-axis adjusting mechanism 33, the Y-axis adjusting mechanism 32 and the Z-axis adjusting mechanism 31, the mobile phone stabilizer enables the mobile phone to shoot at multi angles as needed.

Furthermore, the Z-axis adjusting mechanism 31 comprises a first motor 312 and a first connecting arm 311, wherein the first motor 312 is fixedly connected with the first connecting arm 311, the first connecting arm 311 is fixedly connected to the two-hand control device, the first motor 312 has an output shaft connected with the Y-axis adjusting mechanism 32, and the Y-axis adjusting mechanism 32 is rotatable about the first motor 312 in horizontal direction. The Y-axis adjusting mechanism 32 comprises a second motor 322 and a second connecting arm 321, wherein the second motor 322 is fixedly connected with the second connecting arm 321, the second connecting arm 321 is connected to the output shaft of the first motor 312, the second motor 322 has an output shaft connected with the X-axis adjusting mechanism 33, and the X-axis adjusting mechanism 33 is rotatable about the second motor 322 in a perpendicular direction. The X-axis adjusting mechanism 33 comprises a third motor 332 and a third connecting arm 331, wherein the third motor 332 is fixedly connected with the third connecting arm 331, the third connecting arm 331 is fixedly connected to the output shaft of the second motor 322, the third motor 322 has an output shaft connected with the fixing device for mobile phone, and the fixing device for mobile phone is rotatable about the third motor 332 in a perpendicular direction. In this case, by the coordination of the first motor 312 and the first connecting arm 311, the fixing device for mobile phone may drive the mobile phone to rotate in horizontal direction. By the coordination of the second motor 322 and the second connecting arm 321, the fixing device for mobile phone may drive the mobile phone to rotate through large angles in a perpendicular direction, so as to adjust the position of the mobile phone. By the coordination of the third motor 332 and the third connecting arm, the fixing device for mobile phone may drive the mobile phone to rotate through small angles in a perpendicular direction, so as to adjust the pitch angle of the mobile phone.

Furthermore, the third connecting arm 331 is arranged with a sliding assembly 333, and the sliding assembly 333 comprises a retaining member, and a first sliding groove and a second sliding groove which are superimposed and intersected, wherein the first sliding groove is slidably connected with the second sliding groove, and the retaining member is connected between the first sliding groove and the second sliding groove. When using, the user may release the retaining member at first, so that the first sliding groove and the second sliding groove may be slided in relation to each other. Then, the user may adjust the positions of the first sliding groove and the second sliding groove relative to each other according to the weight of mobile phone, making sure the center of gravity of the mobile phone stabilizer is located at an appropriate position. Finally, the user may lock the retaining member to fix the positions of the first sliding groove and the second sliding groove.

Preferably, the two-hand control device comprises a connection part 22 and two handheld parts 21, wherein the connection part 22 is fixedly connected between the two handheld parts 21, the connection part 22 is fixedly connected with the Z-axis adjusting mechanism 31, and the handheld parts 21 have hollow interiors in which batteries are arranged. The convenient and reasonable design of the connection part 22 fixedly connected between the two handheld parts 21 facilitates two-hand holding, and the design of batteries ingeniously arranged within the interior space of the handheld parts 21 simplifies the structure of the mobile phone stabilizer. Preferably, a foldable joint may be provided at the connection part of the two-hand control device, so as to facilitate the folding of the two handheld parts and save the space occupied by the mobile phone stabilizer.

Preferably, the angle adjusting device is fixedly connected to the center of the connection part 22. In this case, the fixing device for mobile phone and the angle adjusting device can be operated at suitable positions.

Preferably, the handheld part 21 is arranged with a USB interface 211 for connecting with external computer and a plurality of control buttons 212 for controlling the angle adjusting device. Particularly, the plurality of control buttons 212 comprise a four-direction navigation key, a function button and a Bluetooth shutter button. The four-direction navigation key is used for controlling pitch axis and yaw axis movements of the mobile phone stabilizer. In particular, the X-axis adjusting mechanism 33 of the mobile phone stabilizer is controlled to drive the mobile phone to move upwards or downwards when the four-direction navigation key is pressed down and pushed upwards or downwards, and the Z-axis adjusting mechanism 31 of the mobile phone stabilizer is controlled to drive the mobile phone to move leftwards or rightwards when the four-direction navigation key is pressed down and pushed leftwards or rightwards. By means of the function button, the mobile phone stabilizer may be switched between three working modes as follows. When the function button is pressed for one time, the stabilizer is switched to a yawing movement following mode in which the X-axis adjusting mechanism 33 and the Y-axis adjusting mechanism 32 are locked, and yaw axis is smoothly rotated according to manually adjusted directions. When the function button is pressed for successive two times, the stabilizer is switched to a yawing movement and pitching movement following mode in which the Y-axis adjusting mechanism 32 is locked, and yaw axis and pitch axis are smoothly rotated according to manually adjusted directions. When the function button is long-pressed for one second, the stabilizer is switched to a locking mode in which the X-axis adjusting mechanism 33, the Y-axis adjusting mechanism 32 and the Z-axis adjusting mechanism 31 are all locked. Preferably, the control buttons 212 are respectively arranged with an indicator light for indicating working modes and remaining capacity of the batteries. Once the Bluetooth shutter button is pressed down, Bluetooth camera function is activated. Furthermore, the mobile phone stabilizer may be connected with external computer by the USB interface 211, whereby software of the computer chip inside of the mobile phone stabilizer may be upgraded and meanwhile the mobile phone stabilizer may be controlled.

Preferably, the handheld part 21 is provided with a thread at the end away from the connection part 22. With the thread provided at the bottom end of the handheld part 21, it is convenient to connect the stabilizer with a matched support or an extension handle fixedly, so as to facilitate fixation, holding and controlling of the mobile phone stabilizer.

Preferably, the fixing device for mobile phone comprises a clamp plate 13, and a first clamp 11 and a second clamp 12 which are used for fixing the mobile phone, wherein the first clamp 11 and the second clamp 12 are respectively arranged on two sides of the clamp plate 13 and are movable relative to each other. The surfaces of the first clamp 11 and the second clamp 12, which are in contact with the mobile phone, are configured as uneven friction surfaces. The friction surfaces may be made from elastic materials such as rubber, plastic, and the like. By this arrangement, the stability of the mobile phone fixed by the fixing device for mobile phone is increased, and the mobile phone can be prevented from being accidentally dropped during shooting and thus the damage is avoided. The areas where the first clamp 11 and the second clamp 12 are movable relative to each other are arranged on the clamp plate 13, so that different sizes of mobile phones can be matched. In addition, when the first clamp 11 and the second clamp 12, which are movable relative to each other, are positioned at suitable clamping positions, a matched retaining device may be provided to improve the stability of the mobile phone fixed by the fixing device for mobile phone. Preferably, the first clamp 11 and the second clamp 12 may be connected with the clamp plate 13 via a cylinder-shaped slide bar, and the slide bar may be sleeved with a spring to allow reset of the first clamp 11 and the second clamp 12.

Figure 3:
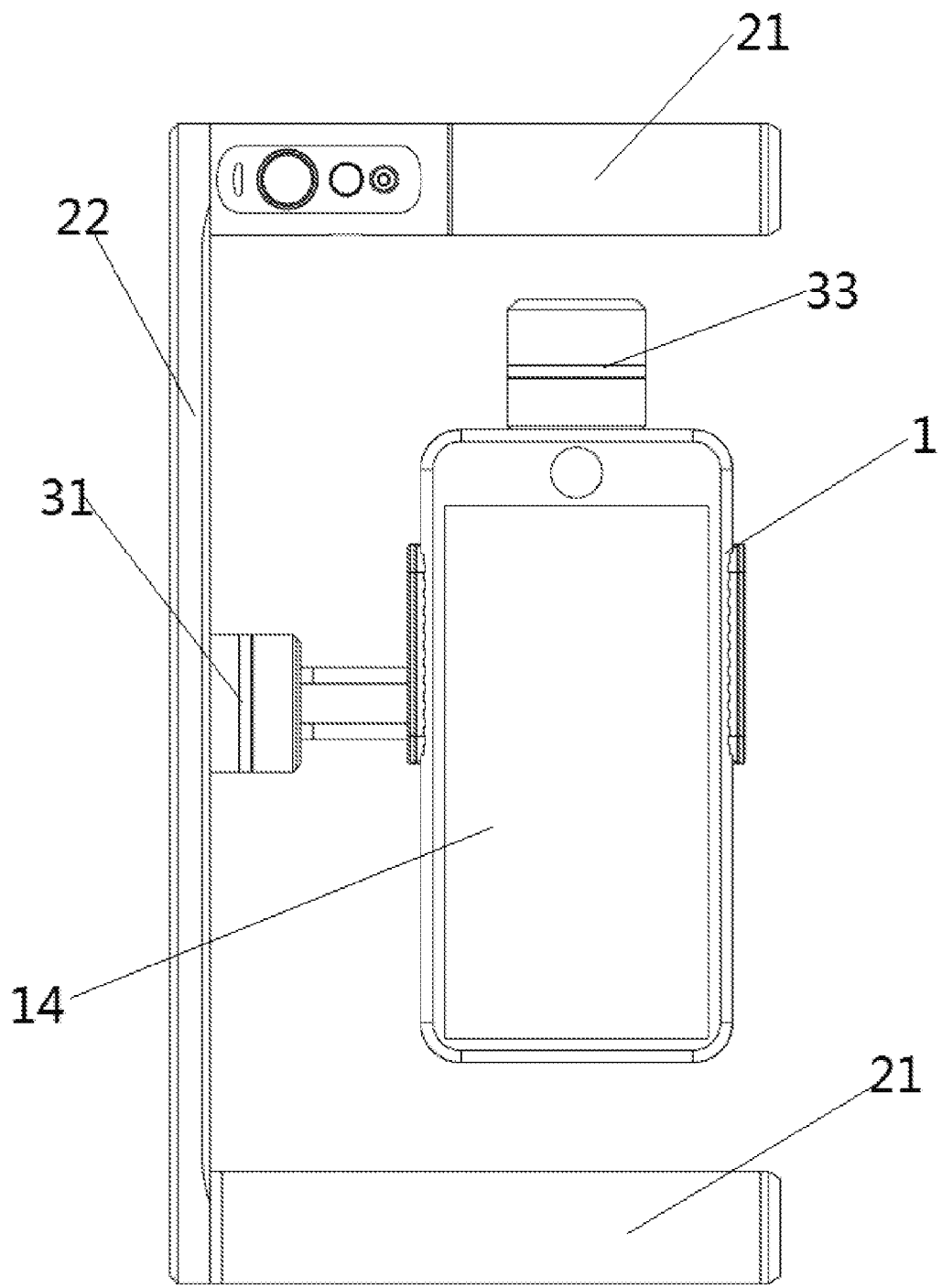
FIG. 3 illustrates a mobile phone stabilizer according to an embodiment of the present invention under further using condition.

It should be further noted that, referring to FIG. 3, the mobile phone stabilizer may be used along a longitudinal direction as needed, so as to facilitate coordination with the camera operation interface of the mobile phone 14.

In conclusion, due to the fixing device for mobile phone, the angle adjusting device and the two-hand control device, the mobile phone stabilizer of the present invention prevents the mobile phone from shaking during shooting and avoids shaking scenes or unclear images, and thus greatly improves the shooting stability of mobile phone. Meanwhile, by the adjustment and coordination of the X-axis adjusting mechanism 33, the Y-axis adjusting mechanism 32 and the Z-axis adjusting mechanism 31, the mobile phone stabilizer enables the mobile phone to shoot at multi angles according to the requirement of the user.

It should be understood that, in this document, terms such as up, down, left, right, top, bottom, inside, middle, horizontal, perpendicular which indicate location or position relationships, are based on the location and position relationships as shown in figures and are merely intended to illustrate but not to limit the present invention. It does not mean or suggest that the mentioned devices or units are necessarily defined by the particular orientation or configured and operated in particular direction.

All the above are merely the preferred embodiments of the present invention, but are not to limit the invention in any form. The present invention is intended to cover all changes and equivalent arrangements included within the principle and scope of the present invention.

What is claimed is:

1. A mobile phone stabilizer, characterized in that: mobile phone stabilizer comprises a fixing device for mobile phone, an angle adjusting device and a two-hand control device;
   wherein the angle adjusting device is connected with the two-hand control device, and the fixing device for mobile phone is connected with the angle adjusting device and is positioned in the middle of the two-hand control device;
   wherein the angle adjusting device comprises an X-axis adjusting mechanism, a Y-axis adjusting mechanism and a Z-axis adjusting mechanism which are orthogonally arranged in space;
   wherein the Z-axis adjusting mechanism has a connecting end fixedly connected with the two-hand control device and has an output end rotatablely connected with a connecting end of the Y-axis adjusting mechanism, the Y-axis adjusting mechanism has an output end rotatablely connected with a connecting end of the X-axis adjusting mechanism, and the X-axis adjusting mechanism has an output end rotatablely connected with the fixing device for mobile phone;
   the two-hand control device comprises a connection part and two handheld parts, wherein the connection part is fixedly connected between the two handheld parts, and the connection part is fixedly connected with the Z-axis adjusting mechanism;
   the handheld part is arranged with an USB interface for connecting with an external computer and a plurality of control buttons for controlling the angle adjusting device;
   the mobile phone stabilizer is connected with the external computer by the USB interface to upgrade software of a computer chip inside of the mobile phone stabilizer;
   the plurality of control buttons comprise a four-direction navigation key, a function button and a Bluetooth shutter button;

the X-axis adjusting mechanism of the mobile phone stabilizer is controlled to drive the mobile phone to move upwards or downwards when the four-direction navigation key is pressed down and pushed upwards or downwards, and the Z-axis adjusting mechanism of the mobile phone stabilizer is controlled to drive the mobile phone to move leftwards or rightwards when the four-direction navigation key is pressed down and pushed leftwards or rightwards;

the mobile phone stabilizer is switched between three working modes by means of the function button: when the function button is pressed for one time, the mobile phone stabilizer is switched to a yawing movement following mode in which the X-axis adjusting mechanism and the Y-axis adjusting mechanism are locked, and a yaw axis is smoothly rotated according to manually adjusted directions; when the function button is pressed for successive two times, the mobile phone stabilizer is switched to a yawing movement and pitching movement following mode in which the Y-axis adjusting mechanism is locked, and the yaw axis and a pitch axis are smoothly rotated according to manually adjusted directions; when the function button is long-pressed for one second, the mobile phone stabilizer is switched to a locking mode in which the X-axis adjusting mechanism, the Y-axis adjusting mechanism and the Z-axis adjusting mechanism are all locked.

2. The mobile phone stabilizer according to claim 1, characterized in that: the Z-axis adjusting mechanism comprises a first motor and a first connecting arm, wherein the first motor is fixedly connected with the first connecting arm, the first connecting arm is fixedly connected to the two-hand control device, the first motor has an output shaft connected with the Y-axis adjusting mechanism, and the Y-axis adjusting mechanism is rotatable about the first motor in horizontal direction.

3. The mobile phone stabilizer according to claim 2, characterized in that: the Y-axis adjusting mechanism comprises a second motor and a second connecting arm, wherein the second motor is fixedly connected with the second connecting arm, the second connecting arm is connected to the output shaft of the first motor, the second motor has an output shaft connected with the X-axis adjusting mechanism, and the X-axis adjusting mechanism is rotatable about the second motor in a perpendicular direction.

4. The mobile phone stabilizer according to claim 3, characterized in that: the X-axis adjusting mechanism comprises a third motor and a third connecting arm, wherein the third motor is fixedly connected with the third connecting arm, the third connecting arm is connected to the output shaft of the second motor, the third motor has an output shaft connected with the fixing device for mobile phone, and the fixing device for mobile phone is rotatable about the third motor in a perpendicular direction.

5. The mobile phone stabilizer according to claim 1, characterized in that: the handheld part has a hollow interior in which a battery is arranged.

6. The mobile phone stabilizer according to claim 1, characterized in that: the handheld part is provided with a thread at an end away from the connection part.

7. The mobile phone stabilizer according to claim 1, characterized in that: the fixing device for mobile phone comprises a clamp plate, and a first clamp and a second clamp which are used for fixing the mobile phone, wherein the first clamp and the second clamp are respectively arranged on two sides of the clamp plate and are movable relative to each other.

\* \* \* \* \*